(12) United States Patent
Corey et al.

(10) Patent No.: US 11,638,627 B2
(45) Date of Patent: May 2, 2023

(54) SYSTEMS AND METHODS FOR MANUFACTURING ORTHODONTIC DEVICES

(71) Applicant: Braces On Demand Inc., Hicksville, NY (US)

(72) Inventors: Colin James Corey, Carlsbad, CA (US); Ammar Ahmed Syed, Unionville (CA); Thomas Patrick Shannon, Byron Center, MI (US)

(73) Assignee: Braces On Demand, Inc., Hicksville, NY (US)

( * ) Notice: Subject to any disclaimer, the term of this patent is extended or adjusted under 35 U.S.C. 154(b) by 294 days.

(21) Appl. No.: 17/011,121

(22) Filed: Sep. 3, 2020

(65) Prior Publication Data

US 2020/0405446 A1    Dec. 31, 2020

(51) Int. Cl.
| | |
|---|---|
| *A61C 7/00* | (2006.01) |
| *A61C 19/02* | (2006.01) |
| *A61C 7/14* | (2006.01) |
| *B33Y 10/00* | (2015.01) |
| *B33Y 30/00* | (2015.01) |
| *B33Y 80/00* | (2015.01) |
| *B33Y 50/02* | (2015.01) |

(52) U.S. Cl.
CPC ............ *A61C 7/002* (2013.01); *A61C 7/14* (2013.01); *A61C 19/02* (2013.01); *B33Y 10/00* (2014.12); *B33Y 30/00* (2014.12); *B33Y 50/02* (2014.12); *B33Y 80/00* (2014.12)

(58) Field of Classification Search
CPC ........... A61C 7/002; A61C 7/14; A61C 19/02; A61C 2202/00; B33Y 10/00; B33Y 30/00; B33Y 50/02; B33Y 80/00; B33Y 50/00; B29C 64/40
See application file for complete search history.

(56) References Cited

U.S. PATENT DOCUMENTS

| | | | | |
|---|---|---|---|---|
| 4,038,753 | A * | 8/1977 | Klein | ............ A61C 7/306 433/18 |
| 5,975,893 | A | 11/1999 | Chishti | |
| 6,206,695 | B1 | 3/2001 | Wong | |
| 7,381,299 | B2 * | 6/2008 | Shannon | ............ D21H 27/30 162/158 |
| 7,648,360 | B2 | 1/2010 | Kuo | |
| 7,940,258 | B2 | 5/2011 | Stark | |

(Continued)

FOREIGN PATENT DOCUMENTS

CN    WO-2021013889    *    1/2021    ............ A61C 13/00

*Primary Examiner* — Lawrence Averick
(74) *Attorney, Agent, or Firm* — Nixon Peabody LLP

(57) ABSTRACT

In some embodiments, apparatuses and methods are provided herein useful to orthodontic kits. In some embodiments, an orthodontic kit comprises a carrier, wherein the carrier is configured to house a plurality of orthodontic appliances, the plurality of orthodontic appliances, and a plurality of support structures, wherein the plurality of support structures includes groups of support structures, wherein each group of support structures connects one of the plurality of orthodontic appliances to the carrier, wherein the orthodontic kit is defined by a computer data file, wherein the computer data file includes data necessary to additively manufacture the orthodontic kit including the carrier, the plurality of orthodontic appliances, and the plurality of support structures.

21 Claims, 8 Drawing Sheets

(56) References Cited

U.S. PATENT DOCUMENTS

| | | | |
|---|---|---|---|
| 10,136,966 B2 | 11/2018 | Reybrouck et al. | |
| 10,179,035 B2 | 1/2019 | Shivapuja | |
| 10,307,224 B2 * | 6/2019 | Tzou | A61C 7/146 |
| 10,314,673 B2 | 6/2019 | Schulhof | |
| 10,806,546 B2 * | 10/2020 | Sirovskiy | A61C 7/002 |
| 2005/0274470 A1 * | 12/2005 | Shannon | D21H 27/30 |
| | | | 162/158 |
| 2009/0019698 A1 * | 1/2009 | Christoff | A61C 19/02 |
| | | | 29/896.11 |
| 2012/0273371 A1 * | 11/2012 | Bathen | A61C 19/02 |
| | | | 206/63.5 |
| 2013/0081271 A1 | 4/2013 | Farzin-Nia | |
| 2014/0212827 A1 * | 7/2014 | Tzou | A61C 7/14 |
| | | | 427/2.29 |
| 2016/0175068 A1 * | 6/2016 | Cai | A61C 7/002 |
| | | | 700/98 |
| 2018/0214258 A1 * | 8/2018 | Ruan | A61C 7/14 |
| 2018/0263730 A1 * | 9/2018 | Sirovskiy | A61C 7/08 |
| 2019/0069980 A1 * | 3/2019 | Kapec | A61C 7/14 |
| 2021/0015593 A1 * | 1/2021 | Shannon | B33Y 10/00 |
| 2022/0110721 A1 * | 4/2022 | Shannon | A61C 7/14 |
| 2022/0258420 A1 * | 8/2022 | Marklin | A61C 13/0019 |
| 2022/0331066 A1 * | 10/2022 | Shannon | B33Y 40/20 |

* cited by examiner ial meaning as is accorded to such terms and expressions by persons skilled in the technical field as set forth above except where different specific meanings have otherwise been set forth herein.

SYSTEMS AND METHODS FOR MANUFACTURING ORTHODONTIC DEVICES

TECHNICAL FIELD

This invention relates generally to orthodontics and, more specifically, the manufacture of orthodontic appliances.

BACKGROUND

Orthodontic clinicians seek to correct malocclusions by use of many different devices, such as braces, retainers, pallet expanders, positioners, etc. Braces, one of the most commonly used devices, include a number of orthodontic appliances such as brackets, archwires, and ligatures. The brackets are affixed to a patient's teeth and the archwire passes through slots in the brackets designed to receive the archwire. The ligatures secure the archwire within the slots. Because no two patients have identical malocclusions or facial geometries, the prescription for each patient's braces must be selected by the clinician. A prescription for braces typically includes specifically selected brackets, archwires, and ligatures. For example, a large practice may have an orthodontic bracket inventory costing over $50,000. Not only does this bracket inventory represent a large overhead for clinicians, it can prevent smaller practices from being able to do business. Consequently, a need exists for systems, methods, and apparatuses that minimize the need for clinicians to stock a large number of orthodontic appliances to treat patients.

BRIEF DESCRIPTION OF THE DRAWINGS

Disclosed herein are embodiments of systems, apparatuses, and methods pertaining to orthodontic kits. This description includes drawings, wherein.

Figure 1:
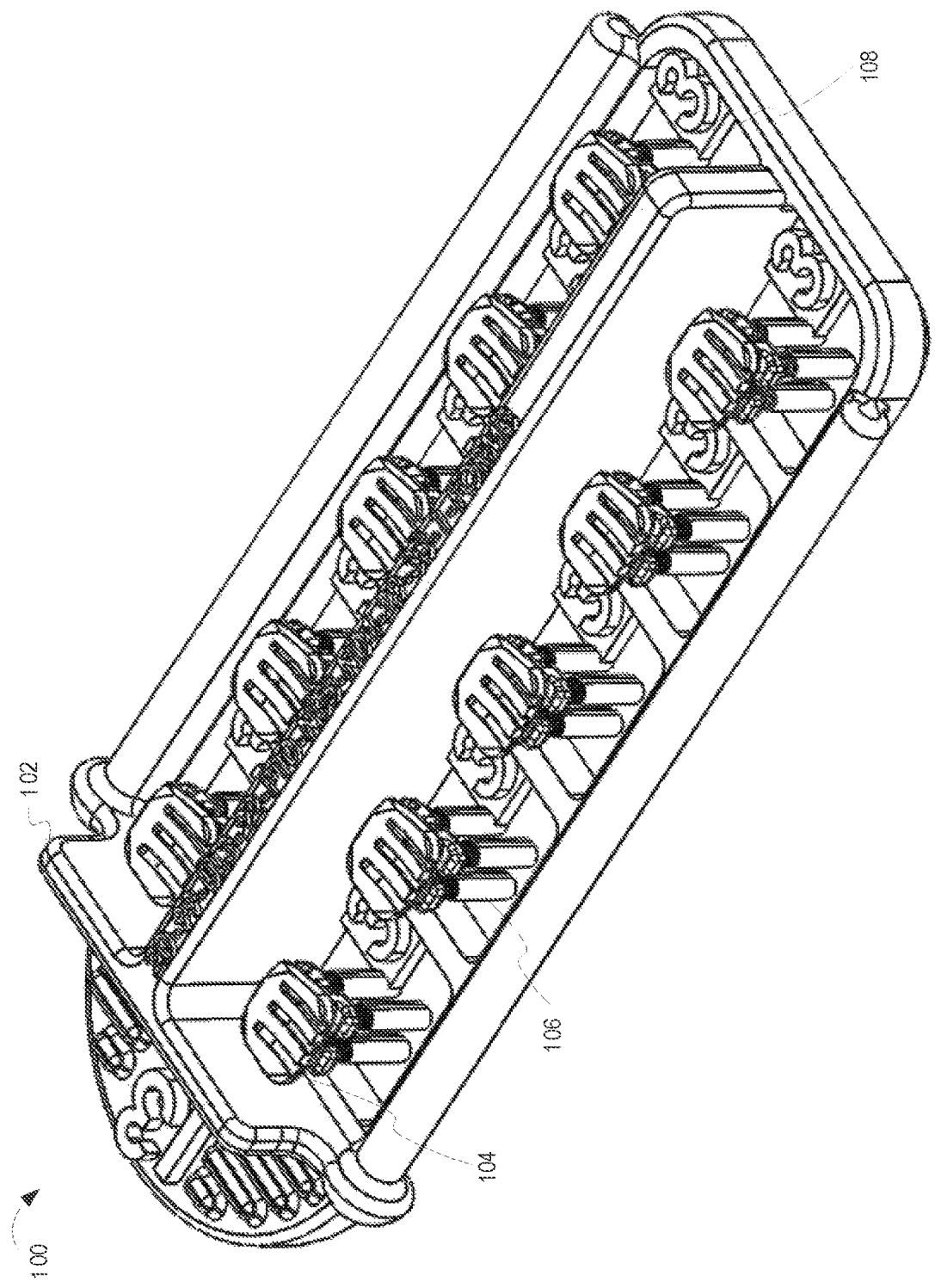
FIG. 1 is a perspective view of an orthodontic kit 100 including a carrier 102, orthodontic appliances 104, and support structures 106, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to orthodontic kits. In some embodiments, an orthodontic kit comprises a carrier, wherein the carrier is configured to house a plurality of orthodontic appliances, the plurality of orthodontic appliances, and a plurality of support structures, wherein the plurality of support structures includes groups of support structures, wherein each group of support structures connects one of the plurality of orthodontic appliances to the carrier, wherein the orthodontic kit is defined by a computer data file, wherein the computer data file includes data necessary to additively manufacture the orthodontic kit including the carrier, the plurality of orthodontic appliances, and the plurality of support structures.

As previously discussed, because no two patients have identical dental or facial structures, many orthodontic appliances are specially designed or selected for each patient. While some orthodontic appliances are custom-molded for patients, such as clear aligners, other orthodontic appliances, such as brackets, come in a variety of prescriptions and are selected by the clinician based on the patient's dental and/or facial geometry. With regard to brackets, clinicians select from among the commercially available prescriptions to choose brackets for each of a patient's teeth. While the total number of commercially available brackets is quite large, a smaller subset of all brackets is used to treat the majority of patients. For example, though the total number of commercially available brackets numbers in the thousands, the majority of patients are treated using only about 20% of those brackets. Accordingly, orthodontic practices may try to keep all of these "common" brackets on hand so that patients can be analyzed and treated promptly (e.g., during the same day, week, etc.). While maintaining such a large inventory may be feasible for large practices, maintaining, or building, such an inventory may be cost prohibitive for small and/or new practices. Additionally, even if a practice is capable of maintaining such an inventory, it is likely not cost effective.

Described herein are systems, methods, and apparatuses that seek to minimize or overcome this problem by allowing clinicians to quickly and affordably manufacture orthodontic kits including orthodontic appliances (e.g., brackets, retainers, pallet expanders, etc.). In one embodiment, clinicians are provided with data files (e.g., computer-aided design files (CAD), such as .stl files). The clinicians then manufacture orthodontic kits based on the data files with additive manufacturing techniques. As one example, a clinician can select an orthodontic appliance that he or she would like to use to treat a patient. The system provides a data file associated with an orthodontic kit to the clinician. The orthodontic kit includes the orthodontic appliance. The clinician then, using a manufacturing device, manufactures the orthodontic kit in his or her office. This manufacturing-on-demand eliminates, or at least reduces, the number of orthodontic appliances that a clinician must have on hand to promptly treat patients. Not only does this allow clinicians to promptly treat patients, but it also reduces costs for the clinician and thus the patient. The discussion of FIG. 1 provides an overview of such an orthodontic kit.

FIG. 1 is a perspective view of an orthodontic kit 100 including a carrier 102, orthodontic appliances 104, and support structures 106, according to some embodiments. The carrier 102 is configured to house the orthodontic appliances 104. The support structures 106 connect the orthodontic appliances 104 to the carrier 102. The support structures 106 comprise groups of support structures 106. Each group of support structures 106 connects one of the orthodontic appliances 104 to the carrier 102.

In one embodiment, the orthodontic kit 100 is additively manufactured, such as by way of the techniques described in U.S. patent application Ser. No. 16/875,618 titled SYSTEMS AND METHODS FOR MANUFACTURE OF ORTHODONTIC APPLIANCES filed on May 15, 2020 and incorporated by reference herein in its entirety. For example, the orthodontic kit 100 can be additively manufactured by a 3D printing process. In such embodiments, the orthodontic kit 100 is additively manufactured as a single unit (e.g., structure). Accordingly, the carrier 102, orthodontic appliances 104, and support structures 106 are additively manufactured as a single unit. Further, the orthodontic kit 100 can be defined by a computer data file (e.g., a CAD file, such as an .stl file). The computer data file includes all of the data necessary to additively manufacture the orthodontic kit 100. That is, the computer data file includes all of the data necessary to additively manufacture the carrier 102, the orthodontic appliances 104, and the support structures 106. In some embodiments, the orthodontic kit 100 can be additively manufactured without additively manufacturing anything in addition to the orthodontic kit 100. For example, the orthodontic kit 100 can be additively manufactured without the need for additional supports, bases, etc.

The support structures 106 provide a structure upon which the orthodontic appliances 104 can be additively manufactured. In some embodiments, the support structures 106 are specific to the orthodontic appliances 104. For example, different types of orthodontic appliances 104 may require different types of support structures 106 for the orthodontic appliances 104 to be additively manufactured correctly. In such embodiments, the groups of support structures 106 may have different types and the different types of groups of support structures 106 may be specific to different types of orthodontic appliances 104. The type of the group of support structures 106 can be based on the dimensions of the orthodontic appliances 104, features of the orthodontic appliances 104 (e.g., presence or lack of hooks), parameters of the orthodontic appliances 104 (e.g., a tip angle of a bracket), etc. For example, a bracket with a hook can be oriented parallel to the carrier 102 and include five support structures 106 (as depicted between FIGS. 4A and 4B), a bracket without any hooks can be oriented parallel to the carrier 102 and include four support structures 106 (as depicted in FIG. 5A), and a molar tube can be oriented normal to the carrier 102 and include three support structures 106 (as depicted in FIG. 5B). Further, the shape, placement, geometry, etc. of the support structures 106 can be tailored to the device associated with the support structures 106. Because the data necessary to additively manufacture the orthodontic kit 100 includes the data necessary to additively manufacture the support structures 106, the support structures can be designed as desired based on the orthodontic appliances 104. For example, the support structures 106 can be designed such than no internal supports are necessary for the orthodontic appliances 104. Additionally, as described in more detail with respect to FIGS. 3 and 4, the support structures 106 can be designed such that the orthodontic appliances 104 are easily removable from the support structures 106.

While the discussion of FIG. 1 provides an overview of an orthodontic kit that can be additively manufactured, the discussion of FIG. 2 provides additional information regarding such an orthodontic kit.

Figure 2A:
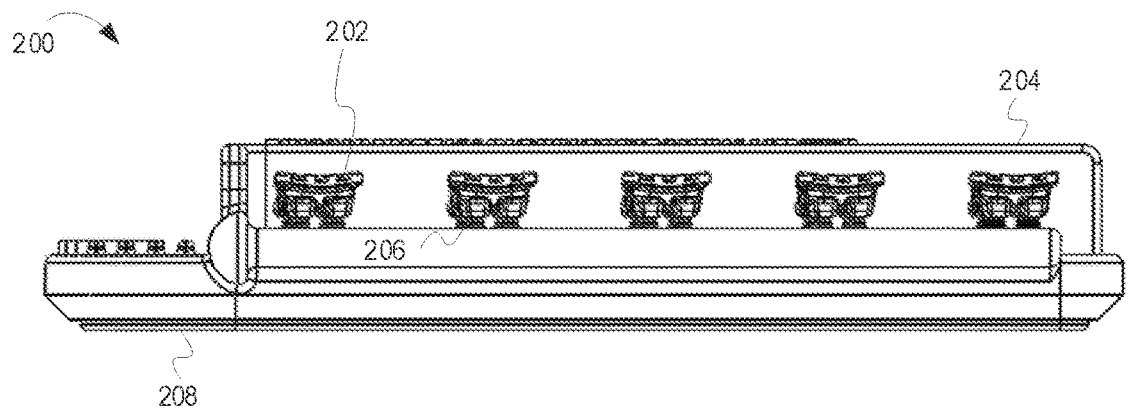
FIG. 2A is a side elevation view of an orthodontic kit 200 including a carrier 208, orthodontic appliances 202, and support structures 206, according to some embodiments.
Figure 2B:
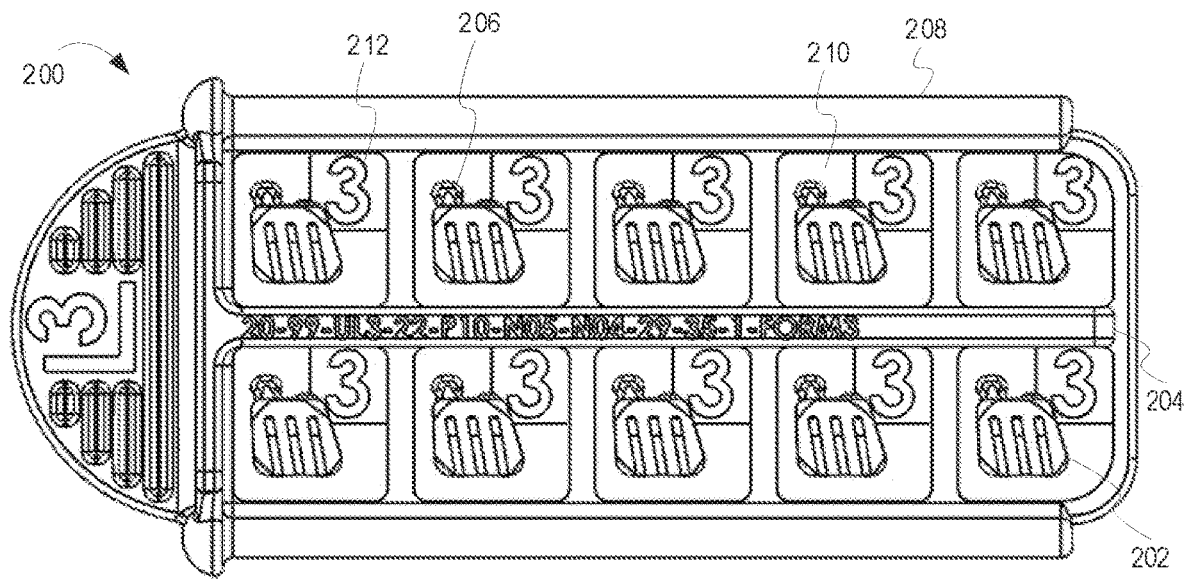
FIG. 2B is a top view of an orthodontic kit 200 including a carrier 208, orthodontic appliances 202, and support structures 206, according to some embodiments.

FIG. 2A is a side elevation view, and FIG. 2B is a top view, of an orthodontic kit 200 including a carrier 208, orthodontic appliances 202, and support structures 206, according to some embodiments. The orthodontic kit 200 includes a carrier 208, orthodontic appliances 202, and support structures 206. In one embodiment, the orthodontic kit 200 is additively manufactured a single unit. That is, the carrier 208, support structures 206, and orthodontic appliances 202 are a single structure. In such embodiments, the orthodontic kit 200 can be defined by a computer data file. Though the orthodontic kit 200 is referred to as being defined by a computer data file, the computer data file can be a composite of multiple computer data files. For example, the carrier 208 may be common to multiple orthodontic kits 200. In this example, a computer data file that defines the carrier 208 may be references in the computer data file that defines the orthodontic kit 200. Additionally, in some embodiments, the orthodontic appliances 202 may be defined by computer data files specific to each orthodontic appliance 202. For example, a bracket, pallet expander, etc. having a specific prescription or parameters may be defined by a computer data file. The computer data file that defines the orthodontic appliances 202 may also define the support structures 206 for the associated one of the orthodontic appliances 202. In embodiments in which the computer data file that defines the orthodontic kit 200 includes multiple data files (e.g., a computer data file defining the carrier 208, computer data files defining the orthodontic appliances 202, and/or computer data files defining the support structures 206), the computer data file that defines the orthodontic kits 200 may be a composite of multiple computer data files.

In some embodiments, the carrier 208 is structured geometrically to provide protection to the orthodontic appliances 202 housed within the carrier 208. For example, the carrier 208 can include protrusions, indentations, etc. that decrease the likelihood of the orthodontic appliances 202 being damaged if the orthodontic kit 200 is, for example, dropped, jostled, struck by another object, etc. As but one example and as depicted in FIGS. 2A and 2B, the carrier 208 includes a raised rail 204. As seen in FIG. 2A, the raised rail 204 extends above the orthodontic appliances 202. In one embodiment, the raised rail 204 extends above the orthodontic appliances 202 in such a manner that if the orthodontic kit 200 is placed upside down (e.g., with the orthodontic appliances 202 facing a surface such as the floor or a table), the raised rail 204 and edge(s) of the carrier 208 contact the surface as opposed to the orthodontic appliances contacting the surface. Though the example depicted in FIGS. 2A and 2B includes only one raised rail 204, embodiments are not so limited. For example, the carrier 208 can include multiple raised portions. Similarly, the carrier 208 can be designed with wells 210 that are below a surface of a portion of the carrier 208 such that the orthodontic appliances 202 are less likely to be damaged should the orthodontic kit 200 be mishandled.

Further, in some embodiments, the orthodontic kit 200 can include markings 212, such as those described in more detail with respect to U.S. Nonprovisional application Ser. No. 17/011,071 titled SYSTEMS AND METHODS FOR MARKING ORTHODONTIC DEVICES filed on Sep. 3, 2020, which is hereby incorporated by reference in its entirety. The markings 212 can be located on the carrier 208 and/or orthodontic appliances 202. In one embodiment, markings 212 are integral to the orthodontic kit 200 (i.e., are manufactured as part of the orthodontic kit 200). In such embodiments, the data necessary to additively manufacture the orthodontic kit can include data to additively manufacture the markings 212. The markings 212 can convey any desired information, such as a prescription associated with the orthodontic kit 200 and/or the orthodontic appliances, a database record in a database, positions of the orthodontic appliances, etc.

Figure 3:
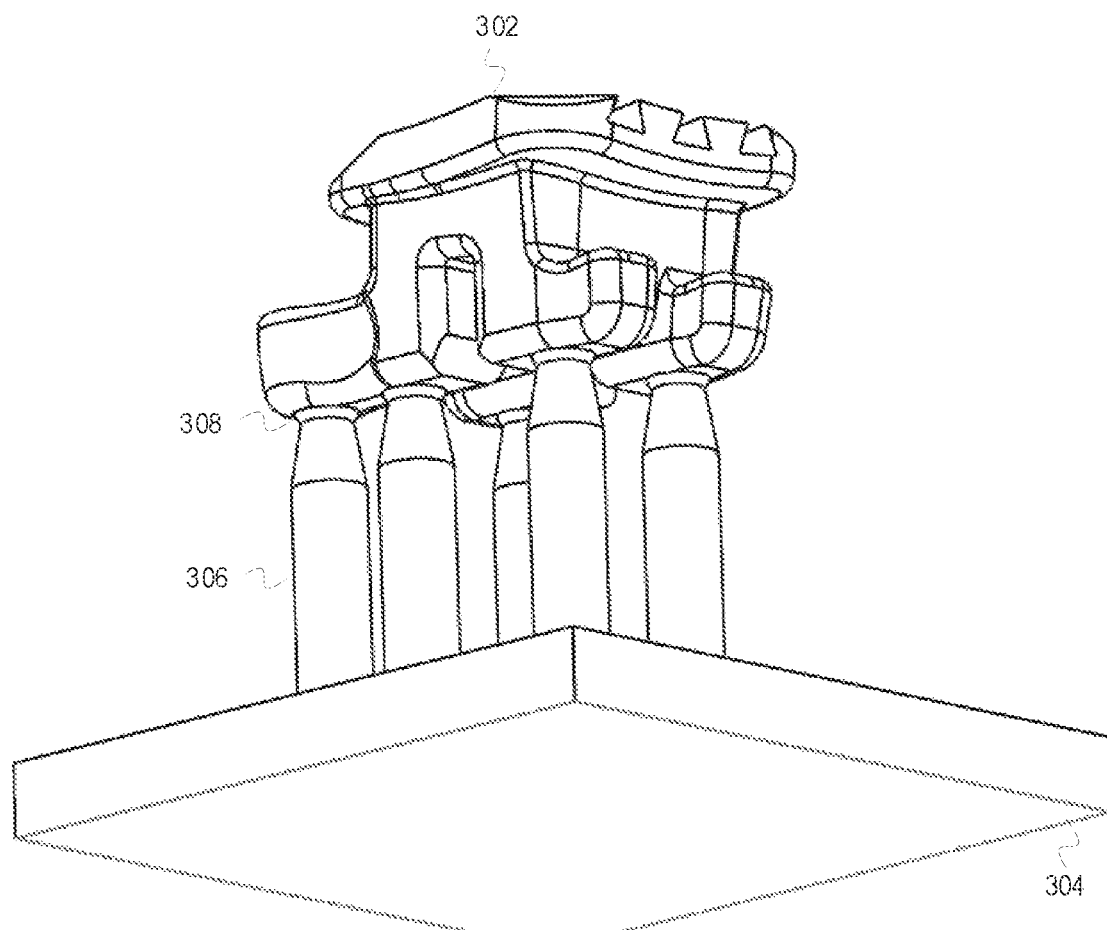
FIG. 3 is a perspective view of an orthodontic appliance 302 connected to a base 304 via support structures 306, according to some embodiments.

While the discussion of FIGS. 1 and 2 describes an orthodontic kit, the discussion of FIG. 3-5 provides additional detail regarding connection of orthodontic appliances to a carrier via support structures. The orthodontic appliances are secured to the carrier via the support structures. The shape, location, geometry, number, features, etc. of the support structures can vary based on the type of orthodontic appliance. There are several considerations for the support structures. First, in some embodiments, it is desirable for the support structures to provide adequate surface area such that the orthodontic appliance can be additively manufactured on top of the support structures. For example, if the support structures are too small (e.g., the surface area of the portion of the support structure upon which the orthodontic appliance is manufactured is too small), too few in number, not spaced appropriately, etc., the orthodontic appliance may not be dimensionally accurate (e.g., the material used to additively manufacture the orthodontic appliance may sag or otherwise be unable to maintain its integrity). Second, in some embodiments, it is desirable for the orthodontic appliance to be cleanly severable from the support structures such that no, or a controlled portion of, residue remains on the orthodontic appliance after the orthodontic appliance is severed from the support structures. Third, in some embodiments, it is desirable to place the support structures relative to the orthodontic appliance such that no internal supports are necessary for the additive manufacture of the orthodontic appliance. FIGS. 3-5 depict various orthodontic appliances and example shapes, locations, geometries, numbers, and features of support structures. Additionally, FIGS. 3-5 depict varying orientations of the orthodontic appliances with respect to the carrier.

FIG. 3 is a perspective view of an orthodontic appliance 302 connected to a base 304 via support structures 306, according to some embodiments. As depicted in FIG. 3, the orthodontic appliance 302 is a bracket. As previously discussed, the orthodontic appliance 302 includes a hook and, in this example, includes five associated support structures 306. Though the example depicted in FIG. 3 includes a bracket, embodiments are not so limited. That is, the orthodontic appliance 302 can be of any suitable type. In some embodiments, the orthodontic appliance 302, the support structures 306, and the base 304 are manufactured (e.g., printed) as a single unit (e.g., as part of an orthodontic kit). Though the base 304 is depicted in FIG. 3 as a separate structure, embodiments are not so limited. For example, the base 304 can simply be a portion of a larger structure, such as a carrier, as descried with respect to FIGS. 1-2.

The support structures 306 connect the orthodontic appliance 302 to the base 304 at a joint 308. In one embodiment, the joint 308 has a double taper configuration. In the double taper configuration, both ends of the joint 308 taper to a section that is, for example, thinner than the rest of the support structure 306 or otherwise includes less material than the rest of the support structure 306. The thinning of the support structure 306 at the joint 308 allows the orthodontic appliance 302 to be detached from the base 304 by a user via physical input. The geometry of the joint 308 focuses stress from physical manipulation of the orthodontic appliance 302 and/or base 304 at a desired location within the joint 308. Accordingly, such joint 308 geometry allows for a clean fracture of the material at, or near, the joint 308. In some embodiments, the orthodontic appliance 302 can be separated from the support structure 306 without leaving any excess material (e.g., residue) on the orthodontic appliance 302.

Additionally, in some embodiments, the locations, numbers, positions, etc. of the support structures 306 can be user-defined. For example, the user can select precise locations of the support structures 306 based on the geometry and/or features of the orthodontic appliance 302. In such embodiments, the support structures 306 can be included in the data file for the orthodontic appliance bracket 302. This provides the user with ability to locate the support structures 306 as desired to facilitate clean and/or easier separation of the orthodontic appliance 302 from the base 304.

Figure 4A:
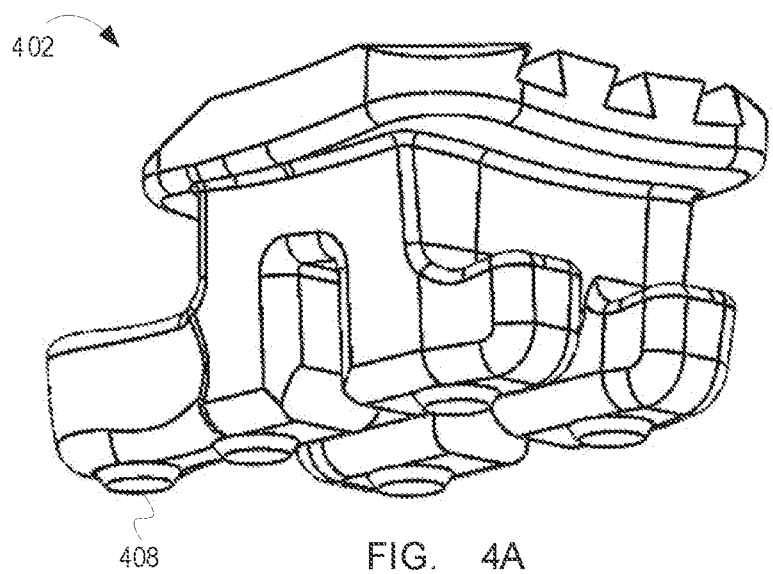
FIG. 4A is a perspective vies of an orthodontic appliance 402, according to some embodiments.
Figure 4B:
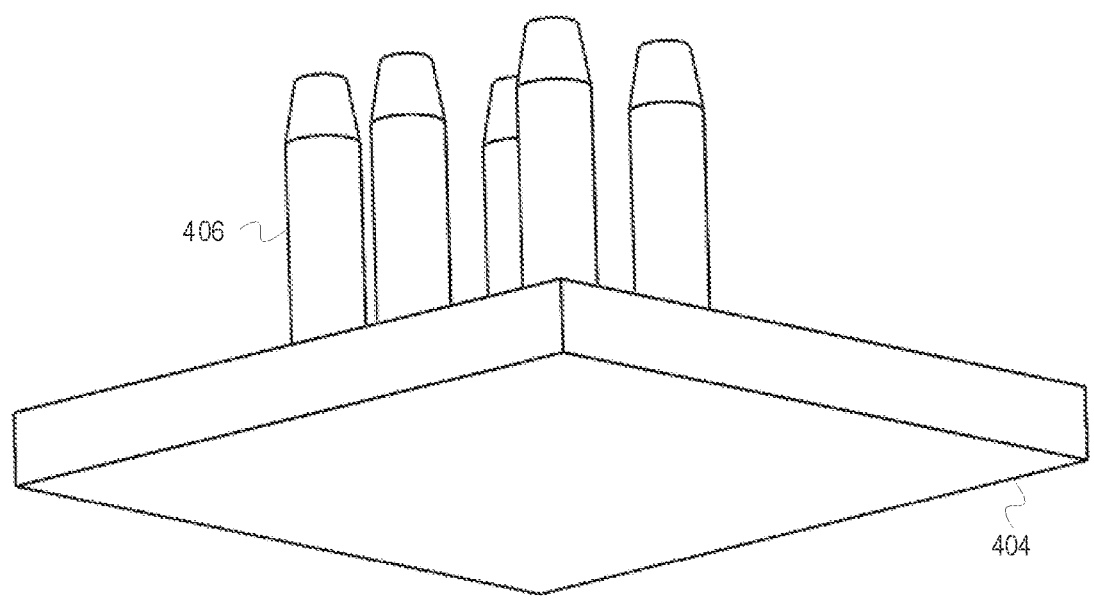
FIG. 4B is a perspective view of a base 404, according to some embodiments.
Figure 5A:
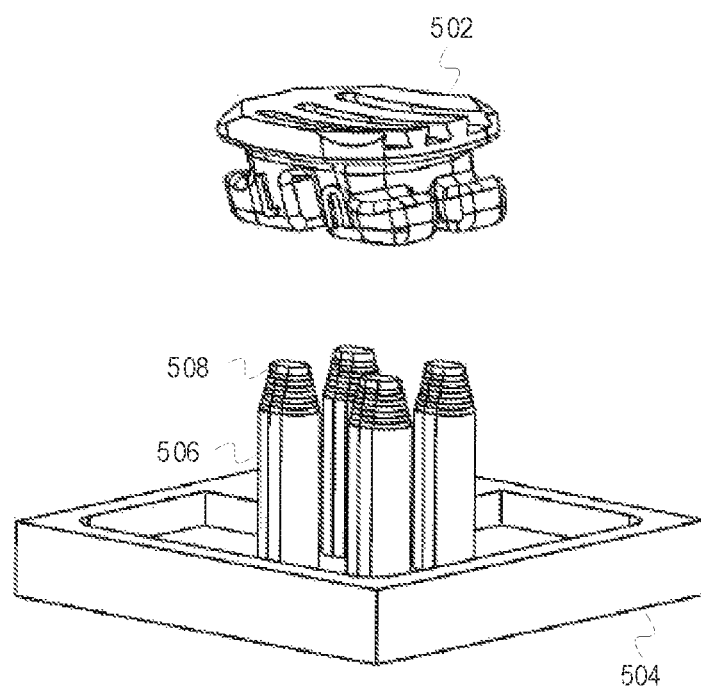
FIG. 5A is a perspective view of an orthodontic appliance 502 and a base 504, according to some embodiments.
Figure 5B:
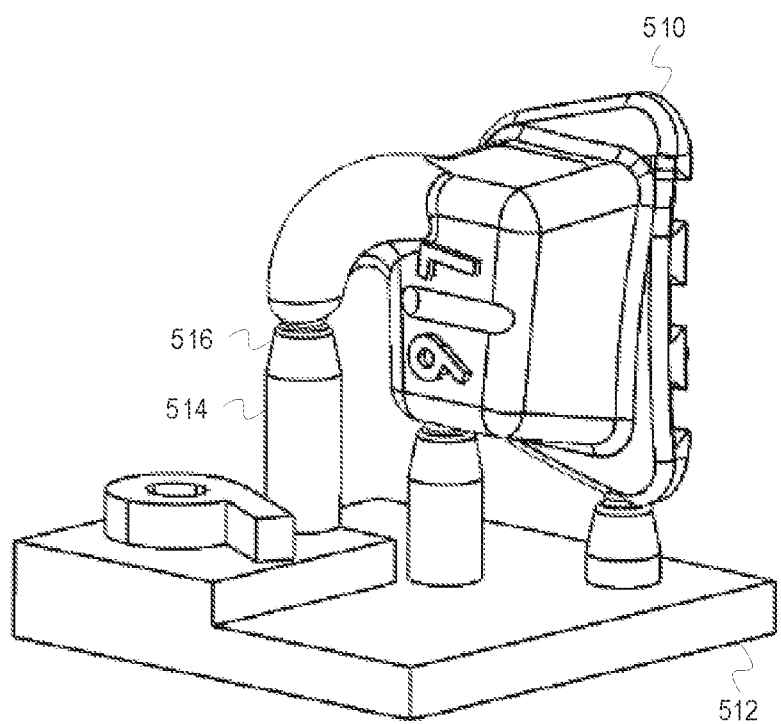
FIG. 5B is a perspective view of an orthodontic appliance 510 connected to a base 512 via support structures 514, according to some embodiments.

FIG. 4A is a perspective view of an orthodontic appliance 402 and FIG. 4B is a perspective view of a base 404, according to some embodiments. As depicted between FIGS. 4A and 4B, the orthodontic appliance 402 is severable from the support structures 4006, and thus the base 404 (e.g., the carrier). In the example provided in FIGS. 4A and 4B, the placement of the support structures 406 and the joints is such that nubs 408 remain on the orthodontic appliance 402 when the orthodontic appliance 402 is removed from the base 404.

FIG. 5A is a perspective view of an orthodontic appliance 502 and a base 504. As previously discussed, the orthodontic appliance 502 is a bracket without hooks and, in this example, includes four support structures 506. FIG. 5A depicts the orthodontic appliance as having been removed from the base 504. That is, in FIG. 5A, the orthodontic appliance 502 is no longer affixed to the base 504 via the support structures 506.

The support structures 506 depicted in FIG. 5A include a stepped configuration 508. The stepped configuration 508, in some embodiments, allows the orthodontic appliances 502 to be cleanly severed from the support structures 506. For example, the orthodontic appliance 502 can be cleanly severed from the support structures 506 such that no, little, or a controlled amount of residue remains on the orthodontic appliances 502 once it has been removed from the support structures 506. In one embodiment, the stepped configuration 508 is defined in a layer-by-layer manner in a data file with which the orthodontic appliance 502 is associated. In this manner, the degree to which each layer of the stepped-configuration 508, the height of each layer of the stepped-configuration 508, the length of the stepped configuration 508, end dimension of the stepped configuration 508, etc. can be user-defined as desired based on the specific orthodontic appliance 502 with which the support structures 506 are associated.

FIG. 5 5B depicts an orthodontic appliance 510 affixed to a base 512 via support structures 514. As previously discussed, the orthodontic appliance 510 is a molar tube and, in this example, includes three support structures 514. Additionally, in this example, the orthodontic appliance 510 is oriented normal to the base 512 and thus the carrier (not pictured). Like the support structures in FIG. 5A, the support structures 514 depicted in FIG. 5B include a stepped configuration 516.

Figure 6:
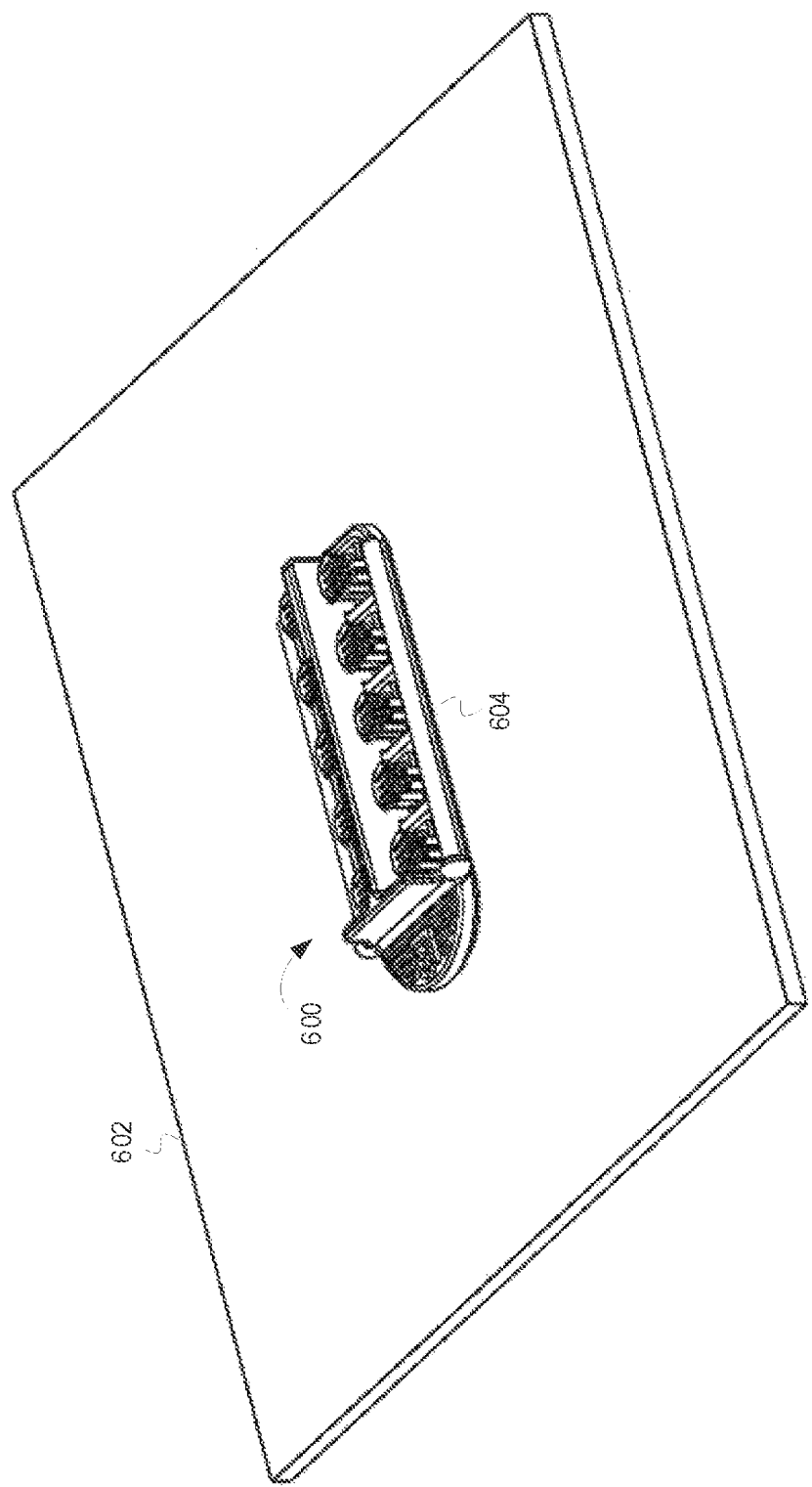
FIG. 6 is a perspective view of an orthodontic kit 600 oriented in a build plane 602, according to some embodiments.
Figure 7:
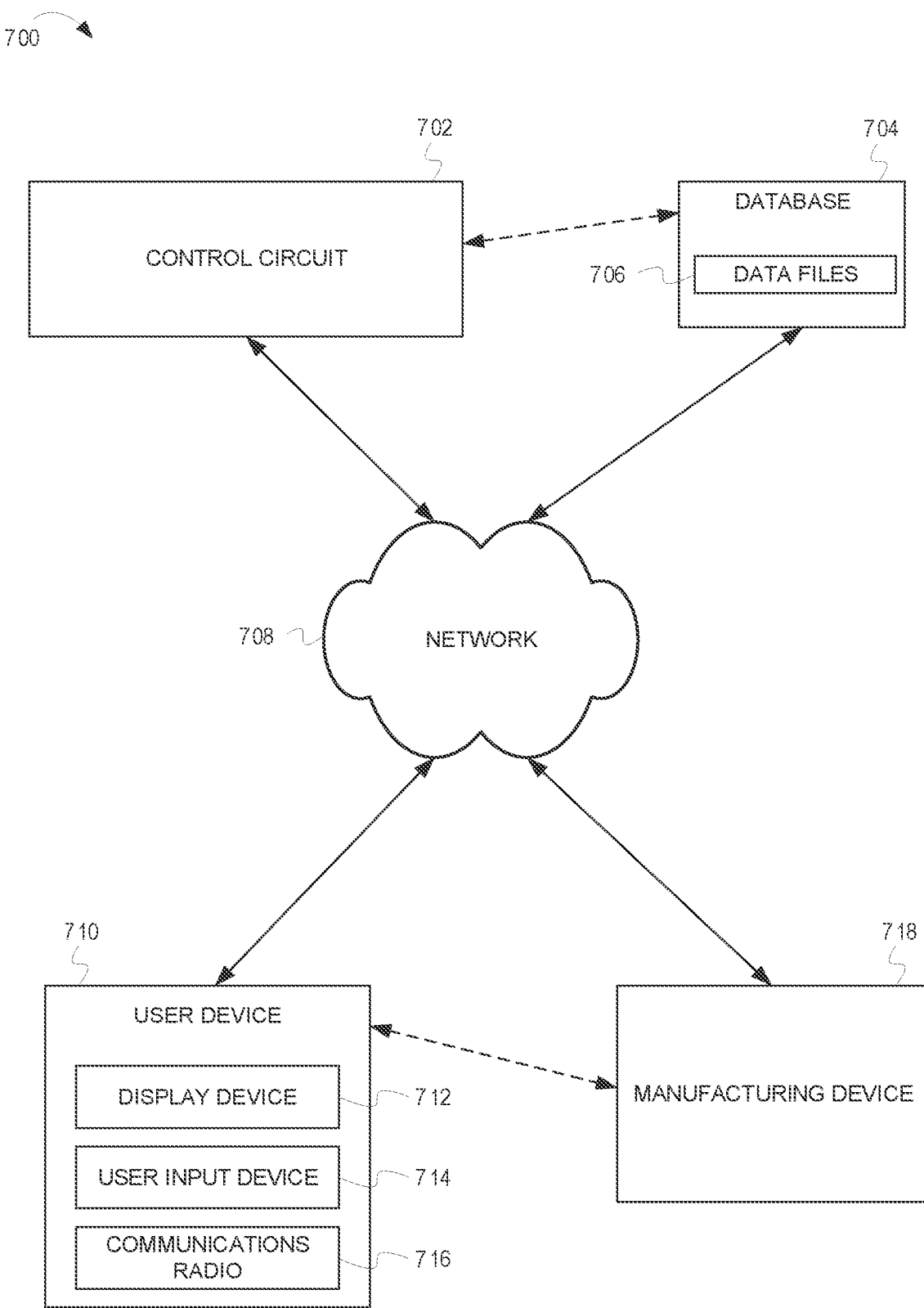
FIG. 7 is a block diagram of a system 700 for additively manufacturing orthodontic kits, according to some embodiments.
Figure 8:
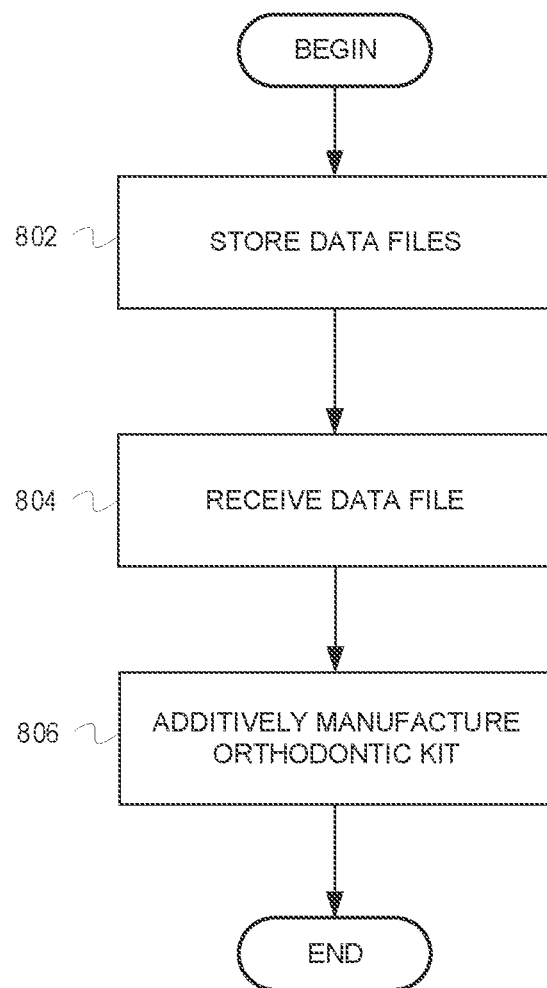
FIG. 8 is a flow chart including example operations for additively manufacturing orthodontic kits, according to some embodiments.

While the discussion of FIGS. 1-5 provides additional information regarding an orthodontic kit and orthodontic appliances included with the orthodontic kit, the discussion of FIGS. 6-8 provides additional detail regarding the manufacture of such an orthodontic kit.

FIG. 5 is a perspective view of an orthodontic kit 600 oriented in a build plane 602, according to some embodiments. As previously discussed, in some embodiments, the orthodontic kit 600 can be additively manufactured. Typically, when a product is additively manufactured, a user has control of the orientation and/or placement of the product in a build plane of the manufacturing device. As previously discussed, in some embodiments, the orthodontic kit 600 can be manufactured without manufacturing anything in addition to the orthodontic kit 600. In some embodiments, this can be accomplished by including an orientation of the carrier 604 of the orthodontic kit 600 in the computer data file. For example, as depicted in FIG. 5, the orientation of the carrier 604 is normal to the build plane 602. Such an orientation allows the orthodontic kits 600 to be additively manufactured without the need for the generation and/or manufacture of any additional supports external to the orthodontic kit 600. In some embodiments, the computer data file can be protected such that a user is not able to manipulate the orthodontic kit 600 and/or the orientation of the orthodontic kit 600 in the build plane 602 to insure consistency and quality of the orthodontic kit 600.

While the discussion of FIG. 6 provides additional information regarding an orientation of an orthodontic kit during manufacture of the orthodontic kit, the discussion of FIG. 7 provides additional detail regarding the manufacture of an orthodontic kit.

FIG. 7 is a block diagram of a system 700 for additively manufacturing orthodontic kits, according to some embodiments. The system 700 includes a control circuit 702, a database 704, a user device 710, and a manufacturing device 718. One or more of the control circuit 702, the database 704, the user device 710, and the manufacturing device 718 are communicatively coupled via a network 708. The network 708 can include a local area network (LAN) and/or wide area network (WAN), such as the Internet. Accordingly, the network 708 can include wired and/or wireless links.

The user device 710 can be any suitable type of computing device (e.g., a desktop or laptop computer, smartphone, tablet, etc.). The user device 710 includes a display device 712. The display device 712 is configured to present a catalogue to a user. The catalogue includes orthodontic devices that the user can obtain via the system 700. For example, the catalogue can include all orthodontic devices that the user can purchase and/or manufacture via the manufacturing device 718. The user interacts with the catalogue via a user input device 714. The user can interact with the catalogue by navigating the catalogue, making selections from the catalogue, modifying orthodontic appliances included in the catalogue, etc. Accordingly, the user input device 714 can be of any suitable type, such as a mouse, keyboard, trackpad, touchscreen, etc. The user device 710 also includes a communications radio 716. The communications radio 716 transmits and receives information for the user device 710. For example, in the case of a smartphone, the communications radio 716 can be a cellular radio operating in accordance with the 4G LTE standard. Once a user has made a selection of an orthodontic device, the user device 710 (e.g., an orthodontic appliance, multiple orthodontic appliances, and orthodontic kit, etc.), via the communications radio 716 and the network 708, transmits an indication of the selection to the control circuit 702.

The control circuit 702 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 702 is configured (for example, by using corresponding programming as will be well understood by those skilled in the art) to carry out one or more of the steps, actions, and/or functions described herein.

By one optional approach the control circuit 702 operably couples to a memory. The memory may be integral to the control circuit 702 or can be physically discrete (in whole or in part) from the control circuit 702 as desired. This memory can also be local with respect to the control circuit 702 (where, for example, both share a common circuit board, chassis, power supply, and/or housing) or can be partially or wholly remote with respect to the control circuit 702 (where, for example, the memory is physically located in another facility, metropolitan area, or even country as compared to the control circuit 702).

This memory can serve, for example, to non-transitorily store the computer instructions that, when executed by the control circuit 702, cause the control circuit 702 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit may be remote from the user device 710 and/or the manufacturing device 718. For example, the user device 710 and the manufacturing device 718 may be located in a clinician's office (e.g., the user's office) whereas the control circuit 702, and possibly the database 704, are cloud-based. The control circuit 702 generally operates to retrieve data files 706 based on the user's selection of orthodontic appliances. The control circuit 702 retrieves the data files 706 from the database 704. The database 704 is configured to store the data files 706. The data files 706 are associated with orthodontic devices. The data files 706 are, for example, CAD files from which the orthodontic devices can be manufactured. The orthodontic device can include a carrier and/or orthodontic appliances (i.e., an orthodontic kit). Accordingly, the data files include data to additively manufacture the orthodontic devices. The control circuit 702 receives the indication of the orthodontic device and retrieves a data file based on the indication of the orthodontic device.

It should be noted that the indication of the orthodontic device may include more than one orthodontic device. For example, the indication of the orthodontic device can include multiple orthodontic appliances, such as full set of brackets for a patient, a set of orthodontic appliances that can be used with multiple patients, a carrier, an orthodontic kit, etc. Accordingly, the data file can be a file including instructions and/or specifications for multiple orthodontic devices. For example, the data file may include multiple data files and/or multiple specifications for a number of brackets.

After retrieving the data file, the control circuit 702 transmits the data file. In some embodiments, the control circuit 702 encrypts or otherwise protects the data file before transmission. The control circuit 702 can encrypt or otherwise protect the data file before transmission to prevent those other than the user from accessing the data file. Additionally, in some embodiments, the control circuit 702 can encrypt or otherwise protect the data file to control the user's access to the data file. For example, in some embodiments, the system is set up such that user's pay on a per manufacture or per print basis. That is, the user does not purchase, and may not later have access to, the data file. Rather, the user purchases access to print or otherwise manufacture an orthodontic appliance based on the data file once (or other specified number of times).

Dependent upon the embodiment, the control circuit 702 transmits the data file to the user device 710, the manufacturing device 718, and/or a third-party device (e.g., a laboratory capable of manufacturing the orthodontic appliance for the user). To whom, or to what device, the data file is transmitted may also aid in achieving access control. For example, in one embodiment, the control circuit 702 transmits the data file directly to the manufacturing device 718. Because the data file is not transmitted to the user device 710, the data file may not be easily accessible by the user device 710. Further, if an entity that controls the control circuit 702 controls the manufacturing device 718, access may to files received by the manufacturing device 718 may be further limited. In some embodiments, the control circuit 702 transmits the data files to the user device 710. In such embodiments, the user device 710 transmits, via the communications radio (e.g., over a universal serial bus (USB) connection, wireless connection based on the 802.11 standard, etc.), the data files to the manufacturing device 718.

The manufacturing device 718 additively manufacturers the orthodontic device(s) based on the data file. The manufacturing device 718 can be of any suitable type, such as a 3D printer. The manufacturing device 718 can be local to, or remote from, one or more of the control circuit 702 and the user device 710. For example, in one embodiment, the user device 710 and the manufacturing device 718 are located in the user's office (i.e., the user device 710 and the manufacturing device 718 are local to one another). Alternatively, the manufacturing device 718 may be located in a laboratory or some other facility that manufactures orthodontic devices for the user.

While the discussion of FIG. 7 provides additional detail regarding a system for additively manufacturing orthodontic kits, the discussion of FIG. 8 provides additional detail regarding a process for additively manufacturing orthodontic kits.

FIG. 8 is a flow chart including example operations for additively manufacturing orthodontic kits, according to some embodiments. The flow begins at block 802.

At block 802, data files are stored. For example, a database can store the data files. The database can be of any suitable type and store the data files in any suitable manner. For example, the database can be a relational database, a NoSQL database, etc. The data files include the data necessary to additively manufacture orthodontic kits. The flow continues at block 804.

At block 804, a data file is received. For example, the data file can be received from the database by a user device, control circuit, and/or third-party device. The flow continues at block 806.

At block 806, the orthodontic kit is additively manufactured. For example, a manufacturing device can additively manufacture the orthodontic kit. The manufacturing device manufactures the orthodontic kit based on the data file. In one embodiment, the manufacturing device manufactures the orthodontic kit my additively manufacturing a carrier, support structures, and orthodontic appliances as a single unit.

In some embodiments, an orthodontic kit comprises a carrier, wherein the carrier is configured to house a plurality of orthodontic appliances, the plurality of orthodontic appliances, and a plurality of support structures, wherein the plurality of support structures includes groups of support structures, wherein each group of support structures connects one of the plurality of orthodontic appliances to the carrier, wherein the orthodontic kit is defined by a computer data file, wherein the computer data file includes data necessary to additively manufacture the orthodontic kit including the carrier, the plurality of orthodontic appliances, and the plurality of support structures.

In some embodiments, a system for manufacturing orthodontic kits comprises a database, wherein the database is configured to store a plurality of computer data files, wherein each of the computer data files includes data necessary to additively manufacture an orthodontic kit, wherein each of the orthodontic kits includes a carrier, a plurality of support structures, and a plurality of orthodontic appliances, wherein the plurality of support structures includes groups of support structures, and wherein each group of support structures connects one of the plurality of orthodontic appliances to the carrier, and a manufacturing device, wherein the manufacturing device is configured to receive, via a network, one of the plurality of date files, and additively manufacture, based on the one of the plurality of computer data files, one of the orthodontic kits, wherein the one of the orthodontic kits is associated with the one of the plurality of computer data files.

In some embodiments, an apparatus and a corresponding method performed by the apparatus comprises storing, in a database, a plurality of computer data files, wherein each of the computer data files includes data necessary to additively manufacture an orthodontic kit, wherein each of the orthodontic kits includes a carrier, a plurality of support structures, and a plurality of orthodontic appliances, wherein the plurality of support structures includes groups of support structures, and wherein each group of support structures connects one of the orthodontic appliances to the carrier, receiving, via a network by a manufacturing device, one of the plurality of computer data files, and additively manufacturing, based on the one of the plurality of computer data files, one of the orthodontic kits, wherein the one of the orthodontic kits is associated with the one of the plurality of computer data files.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An orthodontic kit, the orthodontic kit comprising:
a carrier, wherein the carrier is configured to house a plurality of orthodontic appliances;
the plurality of orthodontic appliances; and
a plurality of support structures, wherein the plurality of support structures includes groups of support structures, wherein each group of support structures connects one of the plurality of orthodontic appliances to the carrier;
wherein the orthodontic kit is defined by a computer data file, wherein the computer data file includes data necessary to additively manufacture the orthodontic kit including the carrier, the plurality of orthodontic appliances, and the plurality of support structures, and wherein the orthodontic kit comprises a single structure.

2. The orthodontic kit of claim 1, wherein the groups of supports structures have types, and wherein each type is specific to at least one type of orthodontic appliance.

3. The orthodontic kit of claim 1, wherein the computer data file includes all of the data necessary to additively manufacture the orthodontic kit such that a manufacturing device additively manufacturing the orthodontic kit does not additively manufacture anything in addition to the orthodontic kit.

4. The orthodontic kit of claim 1, wherein the carrier, the plurality of orthodontic appliances, and the plurality of support structures are additively manufactured as a single unit.

5. The orthodontic kit of claim 1, wherein an orientation of the carrier is included in computer data file, wherein the orientation of the carrier is normal to a build plane.

6. The orthodontic kit of claim 1, wherein the carrier includes at least one raised rail, wherein the at least one raised rail extends above the plurality of orthodontic appliances.

7. The orthodontic kit of claim 1, wherein the plurality of orthodontic appliances are oriented with respect to the carrier such that no internal supports are necessary for the plurality of orthodontic appliances.

8. A system for manufacturing orthodontic kits, the system comprising:
a database, wherein the database is configured to:
store a plurality of computer data files, wherein each of the computer data files includes data necessary to additively manufacture an orthodontic kit, wherein each of the orthodontic kits includes a carrier, a plurality of support structures, and a plurality of orthodontic appliances, wherein the plurality of support structures includes groups of support structures, and wherein each group of support structures connects one of the plurality of orthodontic appliances to the carrier; and
a manufacturing device, wherein the manufacturing device is configured to:
receive, via a network, one of the plurality of computer data files; and
additively manufacture, based on the one of the plurality of computer data files, one of the orthodontic kits, wherein the one of the orthodontic kits is associated with the one of the plurality of computer data files, and wherein the orthodontic kit comprises a single structure.

9. The system of claim 8, wherein the groups of support structures have types, and wherein each type is specific to at least one type of orthodontic appliance.

10. The system of claim 8, wherein each of the plurality of computer data files includes all of the data necessary to additively manufacture one of the orthodontic kits such that the manufacturing device does not additively manufacture anything in addition to the one of the orthodontic kits.

11. The system of claim 8, wherein each of the orthodontic kits is additively manufactured as a single unit.

12. The system of claim 8, wherein an orientation of the carrier is included in the computer data file, wherein the orientation of the carrier is normal to a build plane.

13. The system of claim 8, wherein each carrier includes at least one raised rail, and wherein the at least one raised rail extends above the plurality of orthodontic appliances associated with each carrier.

14. The system of claim 8, wherein the plurality of orthodontic appliances are oriented with respect to the carrier such that no internal supports are necessary for the plurality of orthodontic appliances.

15. A method for manufacturing orthodontic kits, the method comprising:
storing, in database, a plurality of computer data files, wherein each of the computer data files includes data necessary to additively manufacture an orthodontic kit, wherein each of the orthodontic kits includes a carrier, a plurality of support structures, and a plurality of orthodontic appliances, wherein the plurality of support structures includes groups of support structures, and wherein each group of support structures connects one of the plurality of orthodontic appliances to the carrier;
receiving, via a network by a manufacturing device, one of the plurality of computer data files; and
additively manufacturing, based on the one of the plurality of computer data files, one of the orthodontic kits, wherein the one of the orthodontic kits is associated with the one of the plurality of computer data files.

16. The method of claim 15, wherein the groups of supports structures have types, and wherein each type is specific to at least one type of orthodontic appliance.

17. The method of claim 15, wherein each of the plurality of computer data files includes all of the data necessary to additively manufacture one of the orthodontic kits such that the manufacturing device does not additively manufacture anything in addition to the one of the orthodontic kits.

18. The method of claim 15, wherein each of the orthodontic kits is additively manufactured as a single unit.

19. The method of claim 15, wherein an orientation of the carrier is included in the computer data file, wherein the orientation of the carrier is normal to a build plane.

20. The method of claim 15, wherein each carrier includes at least one raised rail, and wherein the at least one raised rail extends above the plurality of orthodontic appliances associated with each carrier.

21. The method of claim 15, wherein the plurality of orthodontic appliances are oriented with respect to the carrier such that no internal supports are necessary for the plurality of orthodontic appliances.

* * * * *